United States Patent

Zug

(10) Patent No.: US 11,820,519 B2
(45) Date of Patent: Nov. 21, 2023

(54) AIR-DRIVEN VAPOR CYCLE REFRIGERATION SYSTEM

(71) Applicant: Honeywell International Inc., Morris Plains, NJ (US)

(72) Inventor: Andrew Zug, Costa Mesa, CA (US)

(73) Assignee: Honeywell International Inc., Charlotte, NC (US)

( * ) Notice: Subject to any disclaimer, the term of this patent is extended or adjusted under 35 U.S.C. 154(b) by 1049 days.

(21) Appl. No.: 16/546,163

(22) Filed: Aug. 20, 2019

(65) Prior Publication Data

US 2020/0070986 A1    Mar. 5, 2020

Related U.S. Application Data

(60) Provisional application No. 62/726,827, filed on Sep. 4, 2018.

(51) Int. Cl.
    *B64D 13/08*    (2006.01)
    *B64D 13/02*    (2006.01)
    *B64D 13/06*    (2006.01)

(52) U.S. Cl.
    CPC ............ *B64D 13/08* (2013.01); *B64D 13/02* (2013.01); *B64D 2013/0648* (2013.01)

(58) Field of Classification Search
    None
    See application file for complete search history.

(56) References Cited

U.S. PATENT DOCUMENTS

| | | |
|---|---|---|
| 3,082,609 A | 3/1963 | Ryan et al. |
| 3,097,504 A | 7/1963 | Quick et al. |
| 3,153,331 A | 10/1964 | Rogers |
| 5,151,022 A | 9/1992 | Emerson et al. |
| 5,442,905 A | 8/1995 | Claeys et al. |
| 5,899,085 A | 5/1999 | Williams |
| 5,918,472 A | 7/1999 | Jonqueres |
| 6,527,228 B2 | 3/2003 | Mitani |

(Continued)

FOREIGN PATENT DOCUMENTS

| | | |
|---|---|---|
| DE | 1153632 B | 8/1963 |
| DE | 69504487 T2 | 3/1999 |

(Continued)

OTHER PUBLICATIONS

Golle et al., "Pneumatically Driven Environmental Control System In Aircrafts Based On A Vapor-compression Cycle," 15th International Refrigeration and Air Conditioning Conference at Purdue; Paper 1439, Jul. 14-17, 2014, 10 pp.

(Continued)

*Primary Examiner* — Tavia Sullens

(74) *Attorney, Agent, or Firm* — Shumaker & Sieffert, P.A.

(57) ABSTRACT

A system includes an air pressurization system (APS) and an environmental control system (ECS). The APS is configured to supply pressurized supply air to the ECS. The ECS includes a primary heat exchanger (PHX), an air-driven turbine downstream of the PHX, and a vapor cycle refrigeration system (VCRS) downstream of the PHX. The PHX is configured to cool the supply air using environmental air. The turbine is configured to power a vapor cycle refrigeration system (VCRS) using the supply air. The VCRS is configured to cool the supply air to generate cabin air.

15 Claims, 3 Drawing Sheets

(56) References Cited

U.S. PATENT DOCUMENTS 10,501,191 B1 * 12/2019 Dooley .................. B64D 13/08
2009/0084896 A1 * 4/2009 Boucher ................ B64D 13/08
454/76

FOREIGN PATENT DOCUMENTS

DE  69805795 T2  1/2003
GB   1459400 A  12/1976

OTHER PUBLICATIONS

Extended Search Report from counterpart European Application No. 19195253.0, dated Jan. 23, 2020, 13 pp.
"Bleed air," Wikipedia, the Free Encyclopedia, last modified on Nov. 30, 2016, accessed on Jan. 8, 2020, 4 pp.
Examination Report from counterpart European Application No. 19195253.0, dated Dec. 9, 2020, 7 pp.
Response to Examination Report dated Dec. 9, 2020, from counterpart European Application No. 19195253.0, filed Jan. 19, 2021, 30 pp.
Response to Extended European Search Report from European Application No. 19195253.0, dated Jan. 23, 2020, filed Apr. 14, 2020, 44 pp.
Communication pursuant to Article 94(3) EPC from European Application No. 19195253.0, dated Jul. 22, 2020, 5 pp.
Response to Communication pursuant to Article 94(3) EPC from European Application No. 19195253.0, dated Jul. 22, 2020, filed Sep. 25, 2020, 28 pp.
Intent to Grant dated May 31, 2021, from counterpart European Application No. 19195253.0, 30 pp.

* cited by examiner

AIR-DRIVEN VAPOR CYCLE REFRIGERATION SYSTEM

RELATED APPLICATION DATA

This application claims priority to U.S. Provisional Application No. 62/726,827, entitled "AIR-DRIVEN VAPOR CYCLE REFRIGERATION SYSTEM," filed on Sep. 4, 2018, which is incorporated herein by reference in its entirety.

TECHNICAL FIELD

The present disclosure relates to systems and techniques for producing conditioned air for an aircraft cabin.

BACKGROUND

A typical commercial transport aircraft provides conditioned air to a cabin of the aircraft over a variety of flight conditions. To supplement air losses and maintain cabin comfort, the aircraft draws in outside air and conditions the outside air for use in the cabin, such as by pressurizing the air using an air pressurization system (APS) and cooling the air using an environmental control system (ECS). As an example, a typical fresh air flow requirement for an Airbus A320 or a Boeing 737 size aircraft is approximately 2.2 pounds per second. An air cycle ECS may typically flow more than this flow requirement at maximum cooling conditions (e.g., on ground) due to a limit on how cold a refrigeration pack discharge temperature of the air cycle ECS may be but may operate at or near the limit at high altitude to minimize energy demand. On the other hand, a vapor cycle ECS may be designed to only flow this much fresh air, regardless of heat load, since additional cooling can be provided by recirculation air.

SUMMARY

In some examples, the disclosure describes a system that includes an air pressurization system (APS) and an environmental control system (ECS). The APS is configured to supply pressurized supply air to the ECS. The ECS includes a primary heat exchanger (PHX), an air-driven turbine downstream of the PHX, and a vapor cycle refrigeration system (VCRS) downstream of the PHX. The PHX is configured to cool the supply air using environmental air. The turbine is configured to power a vapor cycle refrigeration system (VCRS) using the supply air. The VCRS is configured to cool the supply air to generate cabin air.

In other examples, the disclosure describes a method that includes supplying, by an air pressurization system (APS), pressurized supply air to an environmental control system (ECS). The method further includes cooling, by a primary heat exchanger (PHX) of the ECS, the supply air using environmental air. The method further includes powering, by an air-driven turbine downstream of the PHX using the supply air, a vapor cycle refrigeration system (VCRS). The method further includes cooling, by the VCRS downstream of the turbine, the supply air to generate cabin air.

In other examples, the disclosure describes a controller configured to receive a temperature mismatch for a vapor control refrigeration system (VCRS). The VCRS is configured to cool supply air from a turbine. The controller is further configured to determine, based on the temperature mismatch for the VCRS, a speed of a vapor cycle compressor (VCC) of the VCRS. The VCC is powered by the turbine. The controller is further configured to output, to a turbine bypass throttle valve, a signal corresponding to the speed of the VCC.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
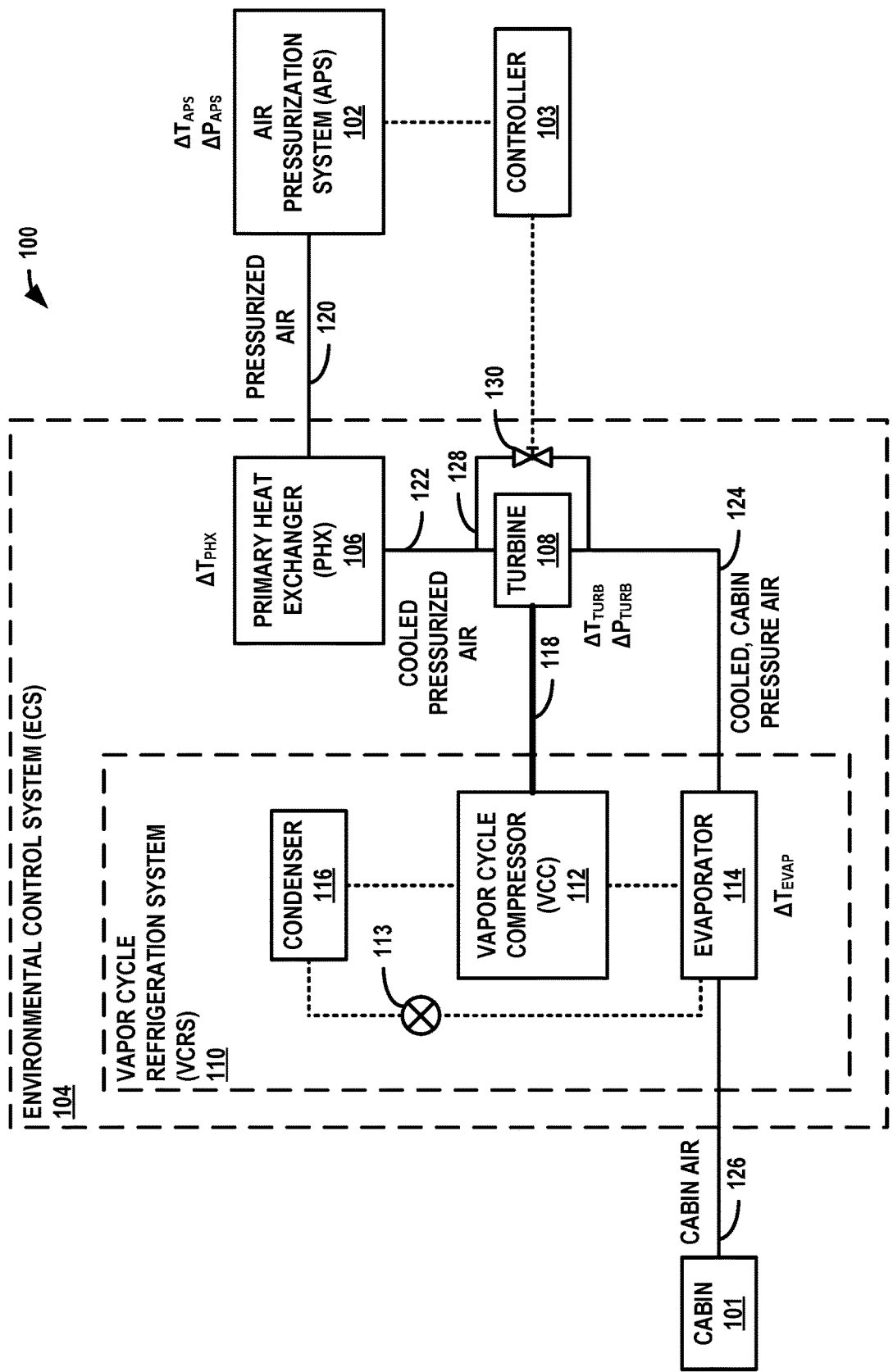
FIG. 1 is a diagram illustrating an example system for generating cabin air.

Different flight states of an aircraft may have different outside air conditions. To adequately condition this outside air for use in a cabin of the aircraft, an air pressurization system (APS) and environmental control system (ECS) may operate differently based on the particular flight state of the aircraft. For example, when the aircraft is at a high altitude, the outside air may have a relatively low pressure and temperature. To condition this supply air, the APS may pressurize, and consequently heat, the supply air to make up for this low pressure. The ECS may cool this pressurized and heated air using the cold outside air through a heat exchanger, with only a small cooling contribution from a vapor cycle refrigeration system (VCRS). In contrast, when the aircraft is grounded, the outside air may have a relatively high pressure and temperature. To condition this supply air, the APS may slightly pressurize the supply air to make up for pressure losses in the ECS. However, this supply air is still relatively cool compared to the pressurized air at high altitudes, and the hot outside air may provide little cooling through the heat exchanger due to a lower temperature difference between the outside air and the supply air. To cool this supply air, the ECS may use a significant cooling contribution from the VCRS. As a result, the VCRS may be sized to provide cooling for these grounded conditions, despite the relatively low amount of use of the VCRS at high altitude conditions.

According to principles of the disclosure, a system of an aircraft may provide conditioned cabin air using an ECS that is smaller than a conventional motor-driven vapor cycle ECS. The system includes an APS, a heat exchanger, an air-driven turbine, and a VCRS. The APS is configured to pressurize the supply air to a moderately high pressure. The pressurized supply air is cooled through the heat exchanger and passed through the air-driven turbine. The air-driven turbine uses the energy from the pressurized supply air to drive a vapor cycle compressor (VCC) of the VCRS. The resulting reduced energy supply air discharged from the turbine has a reduced pressure and a reduced temperature. The supply air is further cooled by the air-driven VCRS and discharged as conditioned air into the cabin. As such, the energy of the pressurized supply air drives the VCRS, while the temperature of the supply air is reduced in stages through the heat exchanger, the turbine, and an evaporator of the VCRS to produce the conditioned air.

In this way, the systems discussed herein may provide conditioned air to a cabin of an aircraft under a variety of conditions using a lower weight system than a conventional system. For example, when the aircraft is grounded, the APS may pressurize and heat the air to a higher pressure and temperature than an APS for a conventional motor driven VCRS ECS. This higher temperature air may be cooled by the heat exchanger due to the high temperature difference between the pressurized air and the outside air. In contrast, a conventional motor driven VCRS ECS may have a significantly smaller temperature difference due to a lower temperature of supply air. The cooled, pressurized supply air may subsequently drive the turbine and, correspondingly, the VCC of the VCRS. At the same time, the supply air discharged from the turbine may depressurize to just above cabin pressure and cool to a lower evaporator inlet pressure than air from a conventional ECS, resulting in a smaller VCRS.

In addition to weight savings, the systems discussed herein may have other advantages. In some instances, the systems discussed herein may produce cleaner air while operating in a grounded flight state. For example, outside air drawn in when an aircraft is grounded may include various hydrocarbon pollutants due to plane exhaust, lubricants, and other odorous fumes from the same or another aircraft. By producing hot, pressurized air, the system may enable the use of a catalytic converter to remove pollutants. In some instances, the system discussed herein may be simpler to operate than a conventional ECS and/or APS. For example, VCCs driven by motors may require costly motor controllers. By driving the VCC using a turbine, the VCC may be controlled using a relatively inexpensive turbine bypass throttle valve. As another example, the APS may be a load compressor driven by an auxiliary power unit (APU). By operating at higher pressures, the envelope of speeds for the load compressor may be smaller, allowing use of a simpler compressor than that required for a conventional motor-driven VCRS ECS.

FIG. 1 is a diagram illustrating an example system 100 for producing conditioned air. System 100 includes a cabin 101, an air pressurization system (APS) 102 and an environmental control system (ECS) 104.

Cabin 101 is a compartment of an aircraft that includes an internal environment. For example, cabin 101 may be configured to house people, cargo, and the like, in the internal environment. Cabin 101 may be fluidically coupled to ECS 104 through cabin air supply line 126 and configured to output cabin air to cabin 101 through cabin air supply line 126. To maintain adequate conditions within the internal environment of cabin 101, such as for personal comfort or required by law or industry standard, ECS 104 may be configured to control ambient conditions of cabin 101. For example, ECS 104 may be configured to control a pressure, temperature, humidity, air flow rate, or other ambient conditions of cabin 101 at various aircraft conditions, such as ground operation, passenger loading, take-off, cruising, descent, and landing. ECS 104 may be configured to generate cabin air from pressurized air according to one or more setpoints for ambient conditions of cabin 101. For example, ECS 104 may generate cabin air to maintain a target range of pressures, temperatures, and/or humidity of cabin 101. ECS 104 may be fluidically coupled to APS 102 through pressurized air supply line 120 and configured to receive pressurized air from APS 102 through pressurized air supply line 120.

Figure 2:
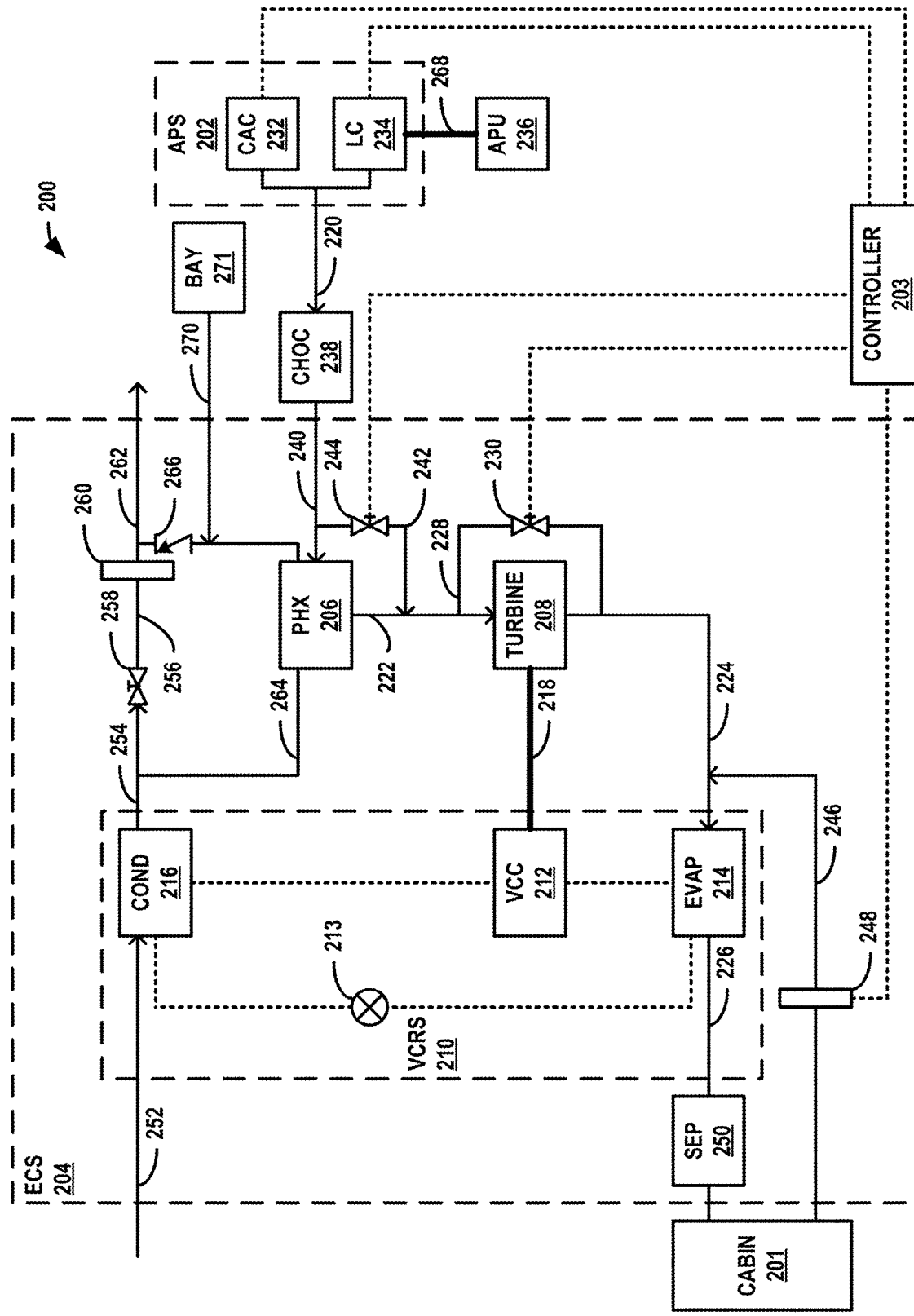
FIG. 2 is a diagram illustrating an example system for generating cabin air.

APS 102 is configured to supply pressurized air to ECS 104. APS 102 may include a variety of air pressurization systems and sources such as a bleed air source (e.g., a main turbine engine), a load compressor (e.g., a load compressor coupled to an auxiliary power unit, as shown in FIG. 2), or a stand-alone air pressurization system such as cabin air compressors (e.g., as shown in FIG. 2), and the like. In some examples, APS 102 may be configured to receive environmental air, such as ram air flow or bleed air, generate pressurized air from the environmental air, and output the pressurized air to ECS 104. APS 102 may be configured to supply pressurized cabin supply air at pressures and flow rates that are adequate to drive an air-driven turbine 108 (and, correspondingly, a vapor cycle refrigeration system (VCRS) 110) across a variety of flight conditions and supply cabin 101 with conditioned air, as will be described further below. In some examples, APS 102 may be configured to supply pressurized air up to 30 psia at flows sufficient for satisfying fresh air ventilation requirements and replacing leakage from cabin 101 and ECS 104. In some example, as will be described further below, APS 102 may be communicatively coupled to controller 103, such that APS 102 may receive control signals from controller 103.

ECS 104 includes a primary heat exchanger (PHX) 106, air-driven turbine 108, and vapor cycle refrigeration system (VCRS) 110. While only one heat exchanger, turbine, VCRS pack are shown, in other examples, one or more heat exchangers, turbines, and/or VCRS packs may be used. PHX 106 is configured to receive pressurized supply air from APS 102, cool the pressurized supply air using environmental air, and discharge the cooled, pressurized supply air to turbine 208. For example, PHX 106 may be a ram air heat exchanger that cools the pressurized supply air in PHX 106 using ram air flow. Depending on the temperature of the environmental air and the pressure required for the pressurized supply air (which corresponds to a temperature of the pressurized supply air), the temperature difference across PHX 106 may vary. PHX 106 may be fluidically coupled to APS 102 through pressurized air supply line 120 and configured to receive pressurized supply air through pressurized air supply line 120. PHX 106 may be fluidically coupled to turbine 108 through PHX discharge line 122 and configured to discharge cooled, pressurized supply air to turbine 108 through PHX discharge line 122.

Turbine 108 is downstream of PHX 106. Turbine 108 is configured receive cooled, pressurized supply air from PHX 106, generate mechanical power from the cooled, pressurized supply air, and discharge cooled, cabin pressure supply air to an evaporator 114 of VCRS 110. As the cooled, pressurized supply air passes through turbine 108, turbine 108 expands the supply air and converts the gaseous energy of the high pressure, high temperature supply air to mechanical energy in the form of shaft power. As a result of this expansion, the cooled, cabin pressure supply air discharged from an outlet of turbine 108 has a lower energy, and thus lower temperature, than the cooled, pressurized supply air received by an inlet of turbine 108.

At the same time, turbine 108 is mechanically coupled to a vapor cycle compressor (VCC) 112 of VCRS 110 through a mechanical link 118. Mechanical link 118 is configured to transfer the mechanical power from turbine 108 to VCC 112. In some examples, mechanical link includes at least one of a sealed shaft or a hermetically-sealed contactless torque coupling, such as a magnetic coupler, to reduce or prevent leakage of refrigerant. The mechanical power produced by turbine 108 is transferred through mechanical link 118 to power VCC 112 and, correspondingly, VCRS 110. In this way, turbine 108 both reduces a temperature and pressure of the cooled, pressurized supply air and powers VCRS 110.

Turbine 108 may be fluidically coupled to evaporator 114 through turbine discharge line 124 and configured to discharge cooled, cabin pressure supply air to evaporator 114 through turbine discharge line 124.

VCRS 110 is downstream of turbine 108. VCRS 110 is configured to receive mechanical power from turbine 108, circulate refrigerant using the received mechanical power, and further cool the cooled, cabin pressure air to generate the cabin air. For example, the cabin air may have setpoints that correspond to certain temperature and pressure ranges. VCRS 110 includes VCC 112, evaporator 114, and a condenser 116 fluidically coupled to each other through pressurized refrigerant supply lines (not labeled). Evaporator 114 is configured to receive cabin pressure air, cool the cabin pressure air using a liquid refrigerant, and discharge cabin air to cabin 101. Condenser 116 is configured to receive vapor refrigerant from VCC 112, condense the vapor refrigerant, and discharge liquid refrigerant to evaporator 114 through an expansion device 113, such as an orifice, tube, or metered valve. In some examples, condenser 116 is cooled by environmental air, such as ram air flow. VCC 112 is configured to receive refrigerant from evaporator 114 and pump the refrigerant to evaporator 114 using mechanical power from turbine 108. Evaporator 114 may be fluidically coupled to cabin 101 through cabin air supply line 126 and configured to discharge cabin air to cabin 101 through cabin air supply line 126. A variety of refrigerants may be used in VCRS 110.

As discussed above, turbine 108 may replace a motor of an electrically-driven VCRS 110. This motor may conventionally be controlled by an expensive and complex motor controller. The speed of VCC 112 may correspond to various temperature parameters of VCRS 110, such as cooling demands and compressor inlet superheat of the refrigerant. To control a speed of VCC 112, a power of turbine 108 may be controlled. To control the power of turbine 108, turbine 108 may have a turbine bypass line 128 with a turbine bypass throttle valve 130. Turbine bypass line 128 may be configured to modulate the power of turbine 108, and correspondingly the speed of VCC 112, by controlling a flow of bypass supply air around turbine 108. In some example, as will be described further below, turbine bypass throttle valve 130 may be communicatively coupled to controller 103, such that turbine bypass throttle valve 130 may receive control signal from controller 103.

System 100 includes controller 103. Controller 103 may be configured to monitor and/or operate one or more process control components of system 100. For example, controller 103 may be communicatively coupled to any of turbine bypass throttle valve 130 and APS 102. Controller 103 may also be communicatively coupled to instrumentation, such as flow meters, temperature sensors, and pressure sensors, and configured to receive measurement signals from the instrumentation. Controller 36 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

In some examples, controller 103 may be configured to control turbine bypass throttle valve 130 to generate a particular power from turbine 108. For example, controller 103 may be configured to receive measurement signals for various parameters of VCRS 110, such as a speed of VCC 112, temperature of air leaving the evaporator 114, or superheat of refrigerant of entering the VCC 112, determine a mismatch between the measurement signals and a setpoint for the corresponding parameter, and send a control signal to turbine bypass throttle valve to reduce the mismatch to within the setpoint. In some examples, controller 103 may be configured to control APS 102 to generate a particular flow of supply air from APS 102. For example, controller 103 may be configured to send control signals to APS 102 to generate supply air having an adequate flow to satisfy cabin ventilation needs, and the resistance to flow from the nozzle of turbine 108 results in pressure sufficient to cause turbine 108 to drive VCC 112.

As an example, APS 102 may pressurize ($\Delta P_{APS}$), and heat ($\Delta T_{APS}$), the feed air to produce the pressurized supply air. PHX 106 may cool ($\Delta T_{PHX}$) the supply air using environmental air to produce cooled pressurized air. Turbine 108 may receive the cooled, pressurized air and expand the cooled, pressurized air to power a vapor cycle refrigeration system (VCRS), thereby reducing a pressure ($\Delta P_{TURB}$) and temperature ($\Delta T_{TURB}$) of the cooled, pressurized air to generate cooled, cabin pressure air. Evaporator 114 of VCRS 110 may receive the cooled, cabin pressure air and cool ($\Delta T_{EVAP}$) the supply air to generate cabin air having a cabin air pressure ($P_{CAB}$) and cabin air temperature ($T_{CAB}$).

$$P_{FEED} + \Delta P_{APS} - \Delta P_{TURB} = P_{CAB}$$

$$T_{FEED} + \Delta T_{APS} - \Delta T_{PHX} - \Delta T_{TURB} - \Delta T_{EVAP} = T_{CAB}$$

System 100 may pressurize the pressurized supply air to a relatively high pressure and temperature compared to a conventional VCRS. However, this relatively higher temperature may enable system 100 to more fully utilize PHX 106 as a heat sink due to the increased temperature difference between the pressurized supply air and the environmental air, especially during grounded conditions. Turbine 108 may use the relatively higher pressure to generate power for powering VCC 112, while also further reducing a temperature of cooled pressurized air. As such, system 100 may use APS 102 as a power source for powering VCRS 110, while also more efficiently utilizing PHX 106 as a heat sink.

In this way, system 100 may generate cabin air using a smaller VCRS than a conventional motor-driven VCRS ECS. The pressurized supply air supplied by APS 102 may be selected to provide adequate pressure to power air-driven turbine 108, and thus cooled using both PHX 106 and turbine 108 before entering evaporator 114. While a size or load of APS 102 may be larger to provide for higher pressure supply air, the reduced weight and/or power consumption of VCRS 110 may create a net weight and/or power reduction for APS 102 and ECS 104. Additionally, the replacement of a motor controller for VCC 112 with turbine bypass throttle valve 130 for control of power of turbine 108 may reduce a cost of system 100.

Systems discussed herein may include additional or alternative features or components that utilize pressurized supply air at a high temperature and/or high pressure. FIG. 2 is a diagram illustrating an example system for generating cabin air. Components of FIG. 2 may be operably similar to like-named components of FIG. 1. For example, cabin 201, APS 202, controller 203, ECS 204, PHX 206, turbine 208, VCRS 210, VCC 212, expansion device 213, evaporator 214, condenser 216, mechanical link 218, pressurized air supply line 220, PHX discharge line 222, turbine discharge line 224, cabin air supply line 226, turbine bypass line 228, and turbine bypass throttle valve 230 may be operably similar to cabin 101, APS 102, controller 103, ECS 104, PHX 106, turbine 108, VCRS 110, VCC 112, expansion device 113, evaporator 114, condenser 116, mechanical link 118, pressurized air supply line 120, PHX discharge line 122, turbine discharge line 124, cabin air supply line 126, turbine bypass line 128, and turbine bypass throttle valve 130 of FIG. 1.

APS 202 includes a cabin air compressor (CAC) 232 and a load compressor (LC) 234. While APS 202 is shown with both CAC 232 and LC 234, any combination and/or number of CACs and LCs may be used. CAC 232 may be configured to receive environmental air and pressurize the environmental air using electrical, hydraulic, or pneumatic power to generate the pressurized supply air. For example, APS 202 utilizing CAC 232 may operate independent of a speed of APU 236 and/or operate from multiple power sources, such as an APU generator, a main engine generator, a ram air turbine emergency generator, batteries, and the like. In this way, APS 202 may be a stand-alone air pressurization system with freedom to operate at optimum speeds independent of the speeds of the main engines and/or an APU. APS 202 also includes a load compressor (LC) 234 mechanically coupled to and driven by APU 236. LC 234 may be configured to receive mechanical power from APU 236, such as through mechanical link 268, and pressurize environmental air using the mechanical power from APU 236 to generate the pressurized supply air. For example, as APU 236 operates, it produces mechanical power that may be used to power other components, including LC 234. APU 236 provides power to non-propulsive components of the aircraft, such as electric, pneumatic, and/or hydraulic power. In some example, as will be described further below, CAC 232 and/or LC 234 may be communicatively coupled to controller 203, such that CAC 232 and/or LC 234 may receive control signal, such as pressure or flow rate control signals, from controller 103.

In some examples, LC 234 may operate at a smaller range of speeds than a load compressor supply air to a conventional VCRS ECS. For example, as described above, the operating pressures of APS 202 may be higher than a conventional system during ground operation. These higher ground operating pressures may correspond to a smaller range of speeds required of LC 234 and, correspondingly, APU 236. As such, LC 234 and/or APU 236 may be simpler to operate than a conventional system that does not use higher pressure supply air, which may require complex gearbox or inlet guide vane arrangements.

In addition to a higher temperature difference across PHX 206, system 200 may utilize higher temperatures of the pressurized supply air in other ways. System 200 includes a catalytic converter—in this example, a combined hydrocarbon and ozone converter (CHOC) 238—upstream of PHX 206. CHOC 238 may be configured to remove hydrocarbon contaminants from the supply air. For example, when the aircraft is grounded, the environmental air used by APS 202 to create the pressurized supply air may contain odorous exhaust, lubricant fumes, and hydraulic fluid from the airplane. In the example of system 200, the pressurized supply air may be at a sufficiently high temperature, such as greater than 200° F., that CHOC 238 may convert the hydrocarbon contaminants into carbon dioxide and water. The resulting supply air may be cleaner and/or less odorous than supply air that is not heated to a high temperature.

System 200 includes a PHX bypass line 242 and PHX bypass throttle valve 244. PHX bypass throttle valve 244 may be configured to control an inlet temperature of turbine 208. This PHX bypass allows the system to provide heating on cold days, or to ensure a minimum heat load to the VCRS if needed to avoid surge of the VCRS compressor. In some example, as will be described further below, PHX bypass throttle valve 244 may be communicatively coupled to controller 203, such that controller 203 may receive a temperature measurement from an inlet of turbine 208 and PHX bypass throttle valve 244 may receive control signal from controller 203 based on the temperature measurement or other system parameters.

System 200 includes various components configured to control a heat sink fluid, such as environmental air, engine fan bypass air, cabin discharge air, or any other available cooling fluid, for use as a heat sink for heat loads within system 200. For example, supply air and/or refrigerant passing through PHX 206 and/or condenser 216, respectively, may be cooled by a heat sink fluid such as environmental air (i.e., ram air). This cooling may be controlled by passive or active flow of the heat sink fluid over the respective components to create a temperature difference for cooling the respective cooling medium. System 200 includes a ram air condenser supply line 252, configured to supply ram air to condenser 216 and a ram air condenser discharge line 254 configured to discharge ram air from condenser 216. The bay air may be supplied from ram air to cool APS 202 or other components in a bay 271. System 200 also includes a ram air PHX line 264 configured to supply (such as during flight conditions) and/or discharge (such as during grounded conditions) ram air to/from PHX 206. System 200 also includes a ram air fan line 256 configured to draw ram air from condenser 216 and/or PHX 206 during grounded conditions using a ram air fan line valve 258 and a ram air fan 260. System 200 also includes bay air PHX supply line 270 may be configured to draw bay air from bay 271 of the aircraft, such as from an inlet near APS 202. During aircraft flight, ram air fan line valve 258 may be shut, such that ram air is supplied to PHX 206 through ram air PHX line 264 and discharged through a PHX check valve 266 to a ram air discharge line 262. During aircraft grounding, ram air fan line valve 258 may be open, such that bay air may be supplied to PHX 206 from bay air PHX supply line 270. Ram air fan 260 may draw ram air from ram air condenser supply line 252 and/or bay air PHX supply line 270, such that ram air may be supplied to both condenser 216 and PHX 206.

System 200 includes various components to recirculate cabin air through evaporator 214. For example, cabin air may become heated and/or humid, such that system 200 may recirculate the cabin air, rather than generate pressurized air at a high energy cost. System 200 includes a cabin recirculation line 246 fluidically coupled to cabin 201 and ECS 204 upstream of evaporator 214. Cabin recirculation line 246 includes a cabin recirculation fan 248 configured to supply cabin recirculation air to VCRS 210. In some example, as will be described further below, cabin recirculation fan 248 may be communicatively coupled to controller 103, such that cabin recirculation fan 248 may receive control signal from controller 103, such as for supplying a particular recirculation flow rate.

In some examples, system 200 includes a water separator (SEP) 250 downstream of the evaporator and configured to receive pressurized supply air, such as from APS 202, and aspirate water using the pressurized supply air. For example, conventional VCRS systems may use electric-driven pumps to aspirate the water separator. In the example of system 200, a small amount of high pressure air from upstream of the turbine may be used to aspirate water separator 250, which may eliminate the need for the pump.

Figure 3:
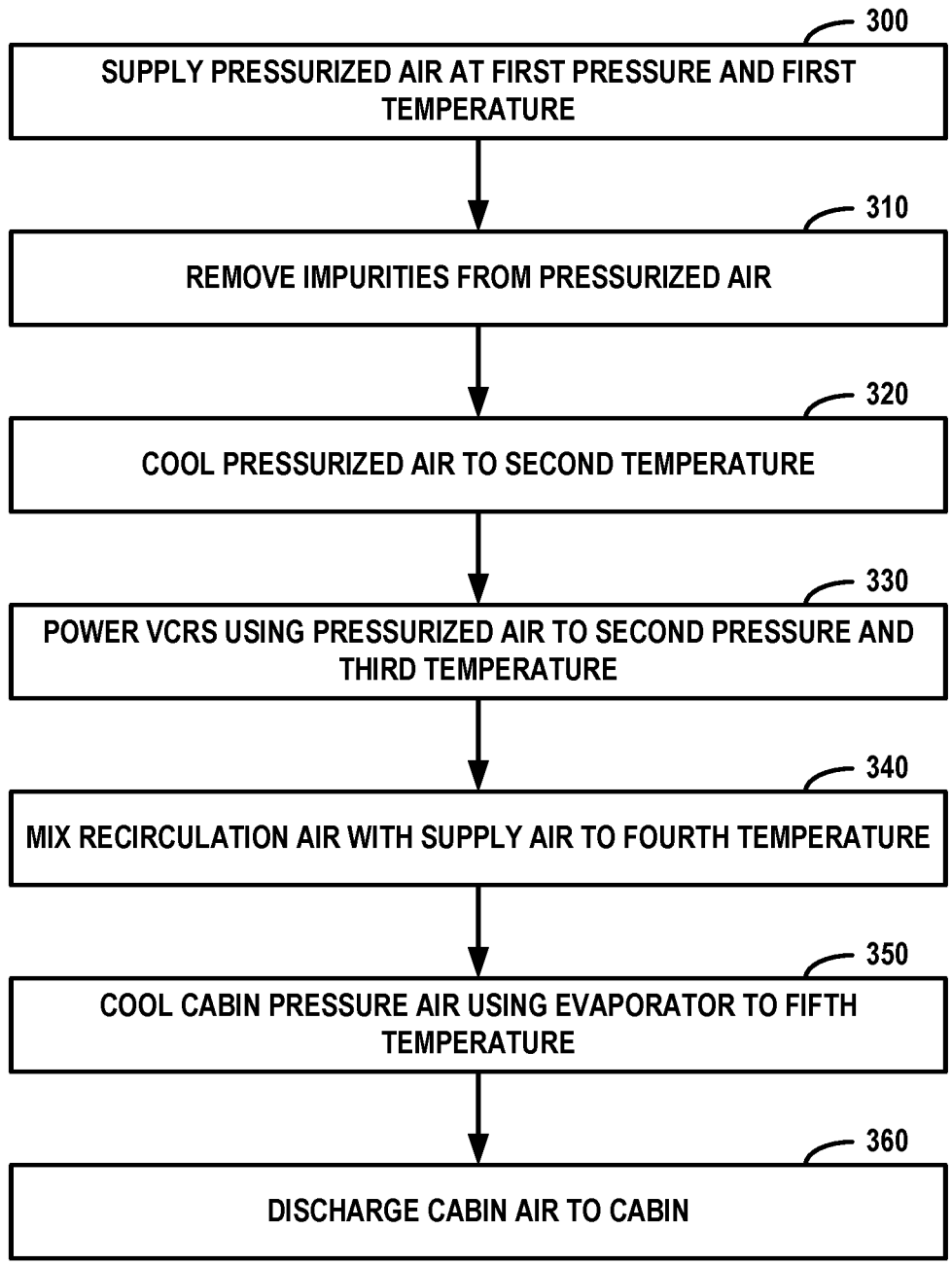
FIG. 3 is a flowchart of an example technique for generating cabin air.

FIG. 3 is a flowchart of an example technique for generating cabin air. The technique of FIG. 3 will be described with respect to system 200 of FIG. 2 for a portion of air passing through system 200. However, it will be understood that other systems may utilize the techniques of FIG. 3. For example, system 100 of FIG. 1 may perform steps 300 and 320-360 of the technique of FIG. 3. Further, the technique of FIG. 3 will be described with respect to operation of an aircraft at ground conditions, and may reference Table 1 below.

APS 202 may supply pressurized supply air to ECS 204 at a first pressure ($P_{i,PHX}$) and first temperature ($T_{i,PHX}$) (300). For example, controller 203 may control APS 202, such as CAC 232 or LC 234, to supply the pressurized supply air to ECS 204 at a particular flow rate. This may correspond to a desired flow rate of air needed by the aircraft cabin. The nozzle of turbine 208 provides a resistance to this flow and creates pressure to drive turbine 208 and power VCRS 210. In the example of Table 1, the environmental air is pressurized to 26 psia by APS 202. As a result, APS 202 heats the pressurized supply air to 235° F. In contrast, in a conventional VCRS system, the environmental air is pressurized only slightly above cabin air pressure to make up for pressure losses in the ECS. As a result, the conventional system heats the air to 135° F.

CHOC 238 may receive the pressurized supply air and remove hydrocarbon impurities from the pressurized supply air (310). For example, the pressurized supply air at the first temperature may be sufficiently high for CHOC 238 to remove the hydrocarbon impurities. In contrast, the temperature of the conventional system may be too low for a catalytic converter to operate.

PHX 206 may cool the supply air using environmental air (320) to a second temperature ($T_{i,TURB}$), less than the first temperature. For example, controller 203 may control ram air fan 260 to supply environmental air to PHX 206. In the example of Table 1, the environmental air cooling PHX 206 may have a temperature of 104° F., such that PHX may have a temperature difference that may result in cooled, pressurized supply air at the second temperature of 130° F. heading into turbine 208.

Turbine 208 may use the pressurized supply air to produce mechanical power to power VCRS 210 (330). For example, controller 203 may control turbine bypass throttle valve 230 to control a power of turbine 208 according to a desired speed of VCC 212. Due to the conversion of this mechanical power from the pressurized supply air, turbine 208 may discharge the supply air at a second pressure ($P_{o,TURB}$), less than the first pressure, and a third temperature ($T_{o,TURB}$), less than the second temperature. The second pressure may correspond to a pressure that is slightly above cabin pressure, such as to make up for remaining pressure losses through VCRS 210. In the example of Table 1, the cooled, pressurized supply air is depressurized to 15 psia and cooled to 60° F. In contrast, in the conventional VCRS that does not utilize a turbine, the supply air remains at the temperature of the outlet of the heat exchanger (135° F.).

In some examples, cabin recirculation line 246 may mix cabin recirculation air with the cooled, cabin pressure air from turbine 208 (240). For example, controller 203 may control cabin recirculation throttle valve 248 to discharge cabin recirculation air upstream of evaporator 214. This may raise a temperature of the supply air entering into evaporator 214 to a fourth temperature ($T_{i,EVAP}$). In the example of Table 1, the cooled, cabin pressure supply air entering evaporator 214 is at a temperature of 85° F. In contrast, in the conventional system, the supply air enters an evaporator at a temperature of 110° F. due to the higher temperature of the supply air mixing with the cabin recirculation air.

Evaporator 214 of VCRS 210 may cool the supply air to a fifth temperature ($T_{o,EVAP}$), less than the fourth temperature, to generate conditioned cabin air (350). In the example of Table 1, the cabin air discharged into cabin 201 has a temperature of 50° F. The temperature difference ($\Delta T_{EVAP}$) across evaporator 214 may be 35° F. In contrast, in a conventional system, the temperature difference across the evaporator may be 60° F. As such, the heat load on the evaporator, and subsequent size of the VCRS, of the conventional system may be significantly larger than VCRS 210 of system 200. ECS 204 may discharge the cabin air to cabin 201 (360).

TABLE 1

|  | Conventional APS + ECS | APS 102 + ECS 104 |
|---|---|---|
| Inlet of PHX | $P_{i,PHX}$ - 16 psia | $P_{i,PHX}$ - 26 psia |
|  | $T_{i,PHX}$ - 135° F. | $T_{i,PHX}$ - 235° F. |
| Inlet of Turbine | N/A | $T_{i,TURB}$ - 130° F. |
| Outlet of Turbine | N/A | $P_{o,TURB}$ - 15 psia |
|  |  | $T_{o,TURB}$ - 60° F. |
| Inlet of Evaporator | $T_{i,EVAP}$ - 110° F. | $T_{i,EVAP}$ - 85° F. |
| Outlet of Evaporator 114 | $T_{o,EVAP}$ - 50° F. | $T_{o,EVAP}$ - 50° F. |
| ΔT of Evaporator 114 | $\Delta T_{EVAP}$ - 60° F. | $\Delta T_{EVAP}$ - 35° F. |

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Table 2 below illustrates a projected weight of a conventional APS and ECS and the APS and EPS system as discussed herein. The example system below includes two CACs powered by motor controllers ("CAC MC") as an air pressurization system.

TABLE 2

|  | Conventional APS + ECS | Example APS + ECS |
| --- | --- | --- |
| CAC (x2) | 94 | 108 |
| CAC MC (x2) | 110 | 127 |
| Turbine Bypass Valve | 0 | 5 |
| Water Spray Pump | 4 | 0 |
| VCRS Pack | 240 | 142 |
| Condenser | 101 | 60 |
| Evaporator | 62 | 36 |
| VCC | 21 | 21 |
| VCC MC | 21 | 0 |
| Refrigerant | 15 | 10 |
| Other VCRS Pack | 20 | 15 |
| Total | 448 | 399 |

As shown in Table 2 above, the example APS may include larger CACs to provide a higher pressure supply air. However, the reduced weight of the VCRS compensates for this higher weight through a smaller condenser, evaporator, and system volume and no VCC motor controller ("VCC MC").

Select examples of the present disclosure include, but are not limited to, the following examples.

Example 1: A system includes an air pressurization system (APS) configured to supply pressurized supply air to an environmental control system (ECS), in which the ECS includes a primary heat exchanger (PHX) configured to cool the supply air using environmental air, an air-driven turbine downstream of the PHX and configured to power a vapor cycle refrigeration system (VCRS) using the supply air, and the VCRS downstream of the turbine and configured to cool the supply air to generate cabin air.

Example 2: The system of Example 1, further including a catalytic converter upstream of the PHX and configured to remove hydrocarbon contaminants from the supply air.

Example 3: The system of any of Examples 1-2, in which the VCRS includes an evaporator configured to receive the supply air from the turbine and cool the supply air using a refrigerant, a condenser configured to cool the refrigerant using environmental air, and a vapor cycle compressor (VCC) configured to receive mechanical power from the turbine through a mechanical link and pump refrigerant in response to receiving the mechanical power.

Example 4: The system of any of Examples 1-3, in which the mechanical link includes at least one of a sealed shaft or a hermetically-sealed contactless torque coupling.

Example 5: The system of any of Examples 1-4, in which the APS includes one or more cabin air compressors.

Example 6: The system of any of Examples 1-5, in which the APS comprises a load compressor driven by an auxiliary power unit (APU).

Example 7: The system of any of Examples 1-6, further including a turbine bypass throttle valve and a turbine bypass line configured to bypass supply air around the turbine.

Example 8: The system of Example 7, further including a controller configured to control the VCRS using the turbine bypass throttle valve.

Example 9: The system of any of Examples 1-8, further including one or more fans configured to supply the environmental air to the PHX.

Example 10: The system of any of Examples 1-9, further comprising a ram air inlet configured to supply the environmental air to the PHX.

Example 11: The system of any of Examples 1-10, further comprising a water separator downstream of the evaporator and configured to aspirate water using a portion of the supply air.

Example 12: The system of any of Examples 1-11, further comprising a cabin recirculation line configured to supply cabin recirculation air to the VCRS.

Example 13: A method includes supplying, by an air pressurization system (APS) of an aircraft, pressurized supply air to an environmental control system (ECS); cooling, by a primary heat exchanger (PHX) of the ECS, the supply air using environmental air; powering, by an air-driven turbine downstream of the PHX using the supply air, a vapor cycle refrigeration system (VCRS); and cooling, by the VCRS downstream of the turbine, the supply air to generate cabin air.

Example 14: The method of Example 13, in which the aircraft is at grounded conditions, a temperature of the pressurized supply air is greater than about 200° F., and a pressure of the pressurized supply air is greater than about 10 psig.

Example 15: The method of any of Examples 13-14, in which the aircraft is at greater than about 30,000 feet elevation, and a pressure of the pressurized supply air is greater than about 3 psig above a pressure of the cabin air.

Example 16: The method of any of Examples 13-15, in which cooling the supply air further includes: receiving, by an evaporator, the supply air from the turbine and cool the supply air using a refrigerant; cooling, by a condenser, the refrigerant using environmental air; receiving, by a vapor cycle compressor (VCC), mechanical power from the turbine through a mechanical link; and pumping, by the VCC and in response to receiving the mechanical power, the refrigerant.

Example 17: The method of any of Examples 13-16, further including removing, by a catalytic converter upstream of the PHX, hydrocarbon contaminants from the supply air.

Example 18: A method includes receiving, by a controller, an indication of a temperature mismatch for a vapor control refrigeration system (VCRS), wherein the VCRS is configured to cool supply air from an air-driven turbine to generate cabin air for a cabin of an aircraft; determining, by the controller and based on the indication of the temperature mismatch for the VCRS, a speed of a vapor cycle compressor (VCC) of the VCRS, wherein the VCC is powered by the turbine; determining, by the controller, a target valve position of a turbine bypass throttle valve corresponding to the speed of the VCC, wherein the turbine bypass throttle valve is configured to bypass cooled supply air from a primary heat exchanger and an air pressurization system (APS)

around an air-driven turbine; and outputting, by the controller and to a turbine bypass throttle valve, a control signal corresponding to the target valve position of the turbine bypass throttle valve.

Example 19: The method of Example 18, further including determining, by the controller, a target pressure of the pressurized supply air corresponding to the speed of the VCC; and outputting, by the controller and to the APS, a control signal corresponding to the target pressure of the pressurized supply air.

Example 20: The method of any of Examples 18-19, further including receiving, by the controller, an indication of an inlet temperature mismatch for the turbine; determining, by the controller and based on the indication of the inlet temperature measurement, a target valve position of a PHX bypass valve corresponding to target inlet temperature; and outputting, by the controller and to the PHX bypass valve, a control signal corresponding to the target valve position of the PHX bypass valve.

Various examples have been described. These and other examples are within the scope of the following claims.

What is claimed is:

1. A system, comprising:
    an air pressurization system (APS) configured to supply pressurized supply air to an environmental control system (ECS), wherein the APS comprises at least one of:
        one or more cabin air compressors electrically driven by an auxiliary power unit (APU); or
        a load compressor mechanically driven by the APU;
    the ECS, comprising:
        a primary heat exchanger (PHX) configured to cool the supply air using:
            during flight conditions, environmental air supplied via a ram air PHX line; and
            during grounded conditions, bay air supplied via a bay air PHX supply line from a bay of the aircraft;
        an air-driven turbine downstream of the PHX and configured to power a vapor cycle refrigeration system (VCRS) using the supply air;
        a turbine bypass throttle valve and a turbine bypass line configured to bypass at least a portion of the supply air around the air-driven turbine;
        the VCRS downstream of the air-driven turbine and configured to cool the supply air to generate cabin air, wherein the VCRS comprises:
            an evaporator configured to receive the supply air from the air-driven turbine and cool the supply air using a refrigerant; and
            a condenser fluidically coupled to a ram air condenser supply line and configured to cool the refrigerant using the environmental air;
        a ram air fan configured to, during the grounded conditions:
            draw the environmental air through the condenser supplied via the ram air condenser supply line; and
            draw the bay air through the PHX supplied via the bay air PHX supply line; and
        a ram air fan line valve configured to close during the flight conditions and open during the grounded conditions; and
        a controller configured to control the VCRS using the turbine bypass throttle valve.

2. The system of claim 1, further comprising a catalytic converter upstream of the PHX and configured to remove hydrocarbon contaminants from the supply air.

3. The system of claim 1, wherein the VCRS further comprises a vapor cycle compressor (VCC) configured to receive mechanical power from the air-driven turbine through a mechanical link and pump the refrigerant in response to receiving the mechanical power.

4. The system of claim 3, wherein the mechanical link comprises at least one of a sealed shaft or a hermetically-sealed contactless torque coupling.

5. The system of claim 3, wherein the controller is configured to control the VCRS using the turbine bypass throttle valve by controlling a speed of the VCC based on at least one of a temperature of the supply air leaving the evaporator or a superheat of the refrigerant entering the VCC.

6. The system of claim 1, wherein the APS comprises the one or more cabin air compressors.

7. The system of claim 1, wherein the APS comprises the load compressor.

8. The system of claim 1, further comprising a water separator downstream of the evaporator and configured to aspirate water using a portion of the supply air.

9. The system of claim 1, further comprising a cabin recirculation line configured to supply cabin recirculation air to the VCRS.

10. The system of claim 1, further comprising a PHX bypass valve configured to bypass at least a portion of the supply air around the PHX, wherein the controller is configured to control an inlet temperature of the air-driven turbine using the PHX bypass valve.

11. A method comprising:
    supplying, by an air pressurization system (APS) of an aircraft, pressurized supply air to an environmental control system (ECS), wherein the APS comprises at least one of:
        one or more cabin air compressors electrically driven by an auxiliary power unit (APU); or
        a load compressor mechanically driven by the APU; and
    operating the ECS at each of grounded conditions and flight conditions of the aircraft, wherein operating the ECS comprises:
        powering, by an air-driven turbine downstream of a primary heat exchanger (PHX) using the supply air, a vapor cycle refrigeration system (VCRS), wherein the ECS comprises a turbine bypass throttle valve and a turbine bypass line configured to bypass at least a portion of the supply air around the air-driven turbine;
        cooling, by the VCRS downstream of the air-driven turbine, the supply air to generate cabin air, wherein cooling the supply air includes:
            receiving, by an evaporator of the VCRS, the supply air from the air-driven turbine;
            cooling, by the evaporator, the supply air using a refrigerant; and
            cooling, by a condenser of the VCRS, the refrigerant using environmental air;
        cooling, during the flight conditions, both the PHX and the condenser using the environmental air supplied via a ram air supply line;
        cooling, during the grounded conditions and using a ram air fan:
            the condenser using the environmental air supplied via the ram air condenser supply line; and
            the PHX using bay air supplied via a bay air PHX supply line from a bay of the aircraft; and controlling, by a controller of the ECS, the VCRS using the turbine bypass throttle valve.

12. The method of claim 11, wherein during operation of the ECS at the grounded conditions:
a temperature of the pressurized supply air is greater than about 200° F., and
wherein a pressure of the pressurized supply air is greater than about 10 psig.

13. The method of claim 11, wherein during operation of the ECS at the flight conditions:
the aircraft is at greater than about 30,000 feet elevation, and
a pressure of the pressurized supply air is greater than about 3 psig above a pressure of the cabin air.

14. The method of claim 11, wherein cooling the supply air further comprises:
receiving, by a vapor cycle compressor (VCC), mechanical power from the air-driven turbine through a mechanical link; and
pumping, by the VCC and in response to receiving the mechanical power, the refrigerant.

15. The method of claim 11, further comprising removing, by a catalytic converter upstream of the PHX, hydrocarbon contaminants from the supply air.

* * * * *